US012191673B2

(12) United States Patent
Mikalsen

(10) Patent No.: US 12,191,673 B2
(45) Date of Patent: Jan. 7, 2025

(54) MARINE VESSEL WITH REPOSITIONABLE ONBOARD INDUCTIVE CHARGE SYSTEM FOR RECHARGING AN ONBOARD RECHARGEABLE ENERGY SOURCE WHEN SERVICING OFFSHORE WIND TURBINES

(71) Applicant: C-Innovation LLC, Cutoff, LA (US)

(72) Inventor: Jan Mikalsen, Covington, LA (US)

(73) Assignee: C-Innovation, LLC, Cut Off, LA (US)

( * ) Notice: Subject to any disclaimer, the term of this patent is extended or adjusted under 35 U.S.C. 154(b) by 422 days.

(21) Appl. No.: 17/540,058

(22) Filed: Dec. 1, 2021

(65) Prior Publication Data

US 2022/0239151 A1    Jul. 28, 2022

Related U.S. Application Data

(60) Provisional application No. 63/121,130, filed on Dec. 3, 2020.

(51) Int. Cl.

| | | |
|---|---|---|
| *H01M 10/44* | (2006.01) | |
| *B60L 53/30* | (2019.01) | |
| *B60L 53/34* | (2019.01) | |
| *H01M 10/46* | (2006.01) | |
| *H02J 7/00* | (2006.01) | |
| *H02J 50/00* | (2016.01) | |
| *H02J 50/10* | (2016.01) | |
| *B63B 27/10* | (2006.01) | |
| *B63B 27/14* | (2006.01) | |

(52) U.S. Cl.
CPC .......... *H02J 50/005* (2020.01); *B60L 53/305* (2019.02); *B60L 53/34* (2019.02); *H02J 7/0042* (2013.01); *H02J 50/10* (2016.02); *B63B 27/10* (2013.01); *B63B 27/143* (2013.01)

(58) Field of Classification Search
CPC ........ H02J 7/0042; H02J 50/005; H02J 50/10; B60L 53/34; B60L 53/305; B60L 2200/32; B60L 2310/42; B60L 53/12; B63J 2003/043; B63J 3/04
USPC .......................... 320/101, 104, 108, 109, 114
See application file for complete search history.

(56) References Cited

U.S. PATENT DOCUMENTS

| | | | | |
|---|---|---|---|---|
| 2006/0104720 | A1* | 5/2006 | Haski | ...................... B60L 53/36 |
| | | | | 405/60 |
| 2021/0394633 | A1* | 12/2021 | Curran | ..................... B60L 53/12 |

FOREIGN PATENT DOCUMENTS

| | | | | |
|---|---|---|---|---|
| CN | 204916094 U | | 12/2015 | |
| DE | 102019124929 A1 | * | 3/2021 | ............. B63B 35/54 |
| DE | 202020102914 U1 | * | 9/2021 | |
| DE | 102020113744 A1 | * | 11/2021 | ............. B60L 53/12 |
| EP | 3 342 626 A1 | | 7/2018 | |
| WO | WO-2013/154131 A1 | | 10/2013 | |
| WO | WO-2017125153 A1 | * | 7/2017 | |
| WO | WO-2020/186271 A1 | | 9/2020 | |

OTHER PUBLICATIONS

International Patent Application No. PCT/US2021/061467, International Search Report and Written Opinion dated Apr. 12, 2022, 8 pgs.

* cited by examiner

*Primary Examiner* — Edward Tso
(74) *Attorney, Agent, or Firm* — Foley & Lardner LLP

(57) ABSTRACT

A marine vessel may include a propulsion system and a rechargeable energy storage system inclusive of at least one rechargeable energy source configured to supply power to the propulsion system. The marine vessel may further include a vessel-side inductive charge component in electrical communication with the rechargeable energy storage system, and be configured to inductively couple with a platform-side inductive charge component positioned at a marine-based platform. The platform-side inductive charge component may be electrically coupled to a power generator that generates electrical power. A moveable structure (e.g., gangplank or crane) may be coupled to the marine vessel on which the vessel-side inductive charge component is positioned to enable the moveable structure to be moveably positioned to wirelessly (e.g., inductively) couple the vessel-side inductive charge component with the platform-side charge component that is positioned at the marine-based platform, thereby causing the rechargeable energy storage device to be recharged.

14 Claims, 4 Drawing Sheets

MARINE VESSEL WITH REPOSITIONABLE ONBOARD INDUCTIVE CHARGE SYSTEM FOR RECHARGING AN ONBOARD RECHARGEABLE ENERGY SOURCE WHEN SERVICING OFFSHORE WIND TURBINES

RELATED APPLICATION

This Application claims priority to U.S. Provisional Patent Application having Ser. No. 63/121,130 filed on Dec. 3, 2020; the contents of which are incorporated herein by reference in their entirety.

BACKGROUND OF THE INVENTION

Offshore wind turbines require maintenance to ensure proper upkeep and operation. To service the offshore wind turbines, marine vessels may be used to travel between the wind turbines. As understood in the art, marine vessels that service offshore wind turbines are sufficiently large to be able to support a crew and needed equipment to service the offshore wind turbines. Such large marine vessels have propulsion systems that are typically powered by diesel fuel. As the marine vessels typically remain at the wind turbines being serviced, the marine vessels must remain powered to ensure that the marine vessels do not collide with the platform or support structure on which the offshore wind turbines are secured. As a result, fuel consumption while servicing offshore wind turbines can be expensive and produce a significant amount of emissions.

SUMMARY OF THE INVENTION

To overcome the problem of marine vessels consuming excessive diesel fuel while being used during offshore wind turbine maintenance, electric-powered marine vessels with rechargeable energy sources may be used. In an embodiment, some or all of the wind turbines may be configured to collect and transfer power to the marine vessels via wireless electrical transfer devices, such as an inductive chargers, positioned at the platforms. In an embodiment, the marine vessels may be configured with corresponding wireless electrical transfer devices, so as to receive power for use in recharging the rechargeable energy sources on the marine vessels.

One embodiment of a marine vessel may include a propulsion system and a rechargeable energy storage system inclusive of at least one rechargeable energy source configured to supply power to the propulsion system. The marine vessel may further include a vessel-side inductive charge component in electrical communication with the rechargeable energy storage system, and be configured to inductively couple with a platform-side inductive charge component positioned at a marine-based platform, the platform-side inductive charge component electrically coupled to a power generator at the marine-based platform that generates electrical power to be electrically and wirelessly conducted via the corresponding inductive charge component to the inductive charge component. A moveable structure may be coupled to the marine vessel on which the vessel-side inductive charge component is positioned to enable the moveable structure to be moveably positioned to wirelessly couple the vessel-side inductive charge component with the platform-side charge component that is positioned at the marine-based platform, thereby causing the rechargeable energy storage device to be recharged. The moveable structure may be dynamically controlled to maintain relative position between the vessel-side and platform-side and platform-side inductive charge components.

A method of recharging a rechargeable storage source on a marine vessel may include positioning the marine vessel at a platform. A structure coupled to the marine vessel on which a vessel-side inductive charge component is positioned may be moved to enable the structure to be moveably positioned to wirelessly couple the vessel-side inductive charge component with the platform-side charge component that is positioned at the marine-based platform. A rechargeable energy source on the marine vessel may be recharged by conducting electrical power signals via the platform-side inductive charge component and vessel-side inductive charge component.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
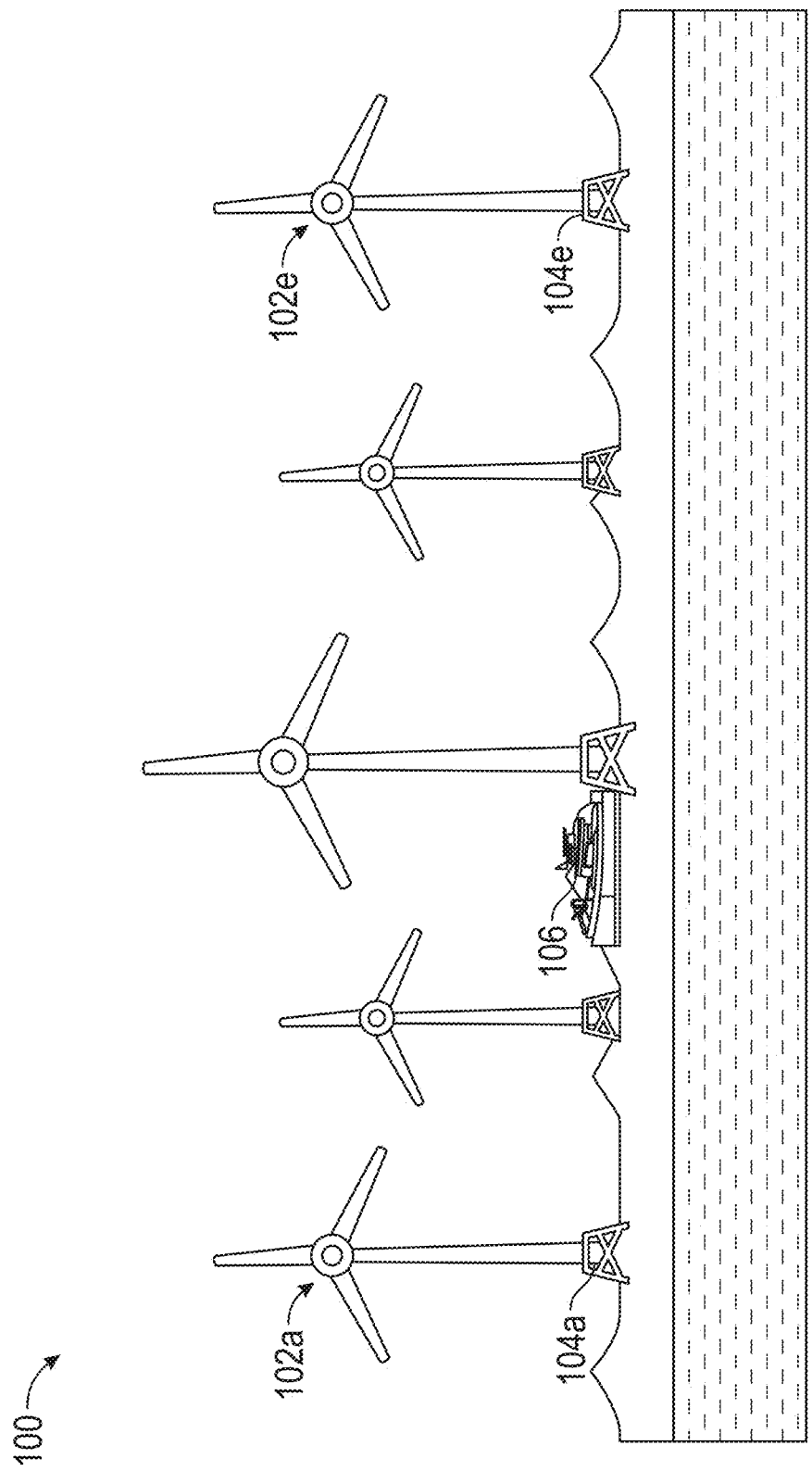
FIG. 1 is an illustration of an illustrative offshore wind turbine farm including a set of offshore wind turbines with respective platform-side inductive charge components and a marine vessel configured with a rechargeable energy source system with a vessel-side inductive charge component.

With regard to FIG. 1, an illustration of an illustrative offshore wind turbine farm 100 including a set of offshore wind turbines 102a-102n (collectively 102) mounted to platforms 104a-104n (collectively 104) with platform-side inductive charge components (see FIG. 2) and a marine vessel 106 configured with a rechargeable energy source system (see FIG. 3) with a vessel-side inductive charge component (see FIG. 3) is shown. The marine vessel 106 may be used to service each of the wind turbines 102 using a fully electric propulsion system and be capable of recharging at some or all of the wind turbines, as further described herein. By including an inductive charge component that is repositionable on the marine vessel 106, such as positioning the inductive charge component on a bottom of a gangplank (see FIG. 2) or carried by a crane, for example, cost may be reduced for the platforms 104 as a single moveable component (i.e., on the marine vessel 106) may be utilized rather than multiple moveable components (i.e., moveable components on multiple or all platforms 104). In other words, the inductive charge component on the platform(s) may in a fixed position and the vessel side-inductive charge component may be moveable, and optionally dynamically controlled to be maintained in a stable position (i.e., in a fixed position within a physical distance tolerance, such as 3-inches). Although a wireless solution, such as an inductive charge system, is ideal, it should be understood that other wired or plug solutions on moveable structures may be possible, as well.

Figure 2:
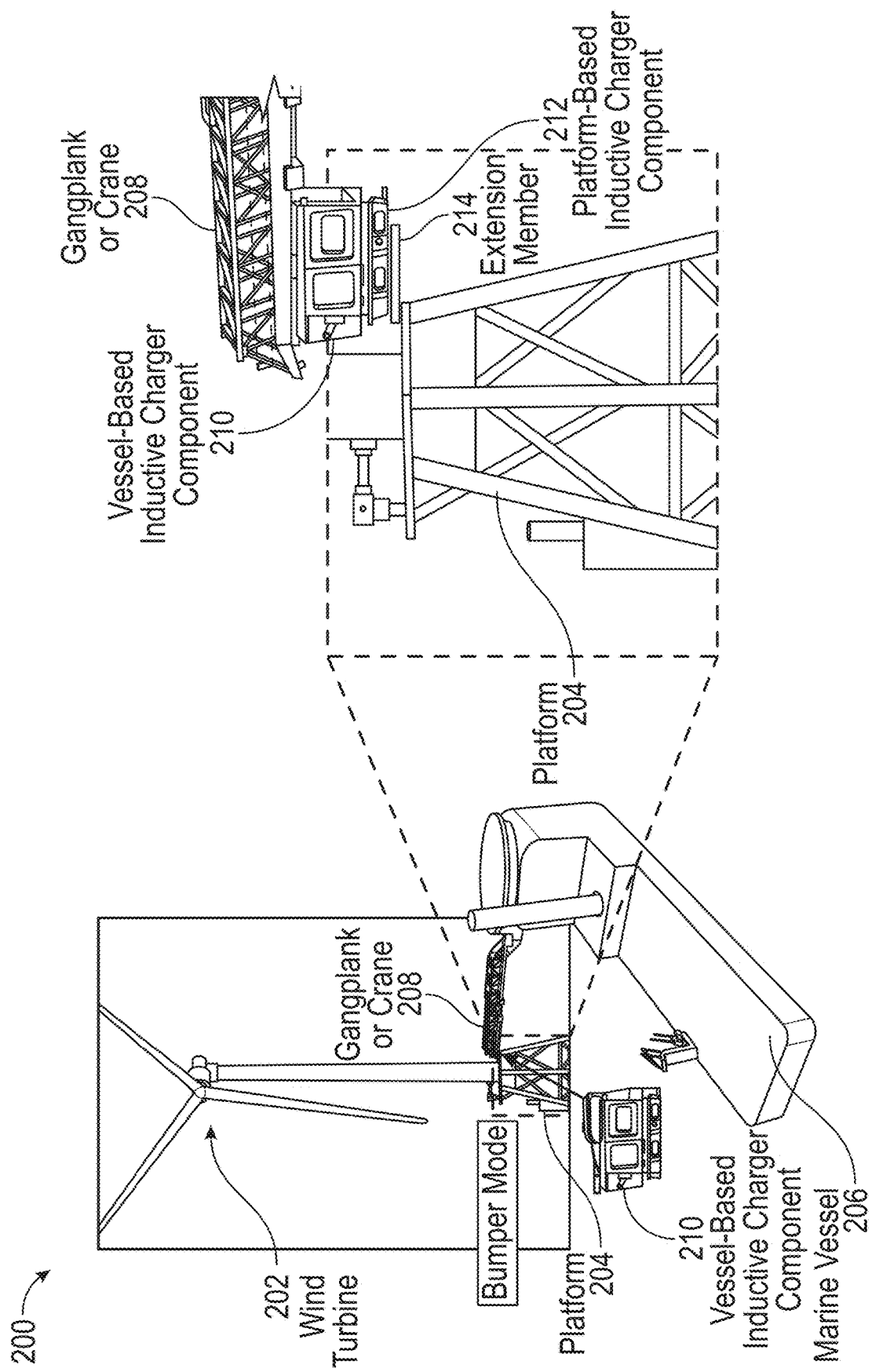
FIG. 2 is an illustration of an illustrative scene in which a marine vessel is recharging a rechargeable energy source using inductive charging from a marine platform, in this case an offshore wind turbine.

With regard to FIG. 2, an illustration of an illustrative scene 200 in which a marine vessel is recharging a rechargeable energy source using inductive charging from a marine platform, in this case an offshore wind turbine, is shown. The scene 200 may include a wind turbine 202 affixed to a marine platform 204. A marine vessel 206 may be configured to engage with the platform 204 using a gangplank or crane 208. Mounted beneath the gangplank 208 may be a vessel-side inductive charger component 210 that may engage a platform-side inductive charger component 212 positioned on or extending from the platform 204. For example, an extension member 214 may be coupled to the platform 204 and have a platform-based inductive component mounted thereon. In an embodiment, the platform-based inductive component 212 may be positioned facing upward, thereby enabling the vessel-side inductive charger component 210 mounted beneath the gangplank or crane 208 to be positioned above the upward facing platform-based inductive component 212. It should be understood that the platform-based inductive charger component 212 and/or vessel-side inductive charger component 210 may have different orientations, such as being horizontally aligned with one another or otherwise. It should be understood that the platform-based inductive charger component 212 may have a power system that is connected to an output of the wind turbine 202 or any other power source to draw energy therefrom to supply the platform-based inductive charger component 212.

In an embodiment, charge storage elements (see FIG. 3) may be positioned on the platform 204, thereby storing a charge that may be drawn by the rechargeable energy storage system even if the wind turbine 202 is not operational while the marine vessel 206 is positioned thereat. By having the platform-based inductive charger component 212 stationary relative to the vessel-based inductive charger component 210, an operator of the marine vessel 206 may focus on maintaining position of the vessel-based inductive charger component 210 relative to the platform-based inductive charger component 212. In an embodiment, an extension member 214 on which the platform-based inductive charger component 212 may be fixed position relative to the platform. In an embodiment, the extension member 214 may have the ability to be moved so as to maintain a relative position between the extension member 214 and gangplank 208. Similarly, the gangplank 208 may have a controller that may be used to dynamically adjust position of the gangplank 208 so as to maintain the vessel-based inductive charge component 210 in a stable position relative to the platform-based inductive charger component 212 in case of movement of the marine vessel 206 relative to the platform 204 due to waves, wind, or current, for example.

Figure 3:
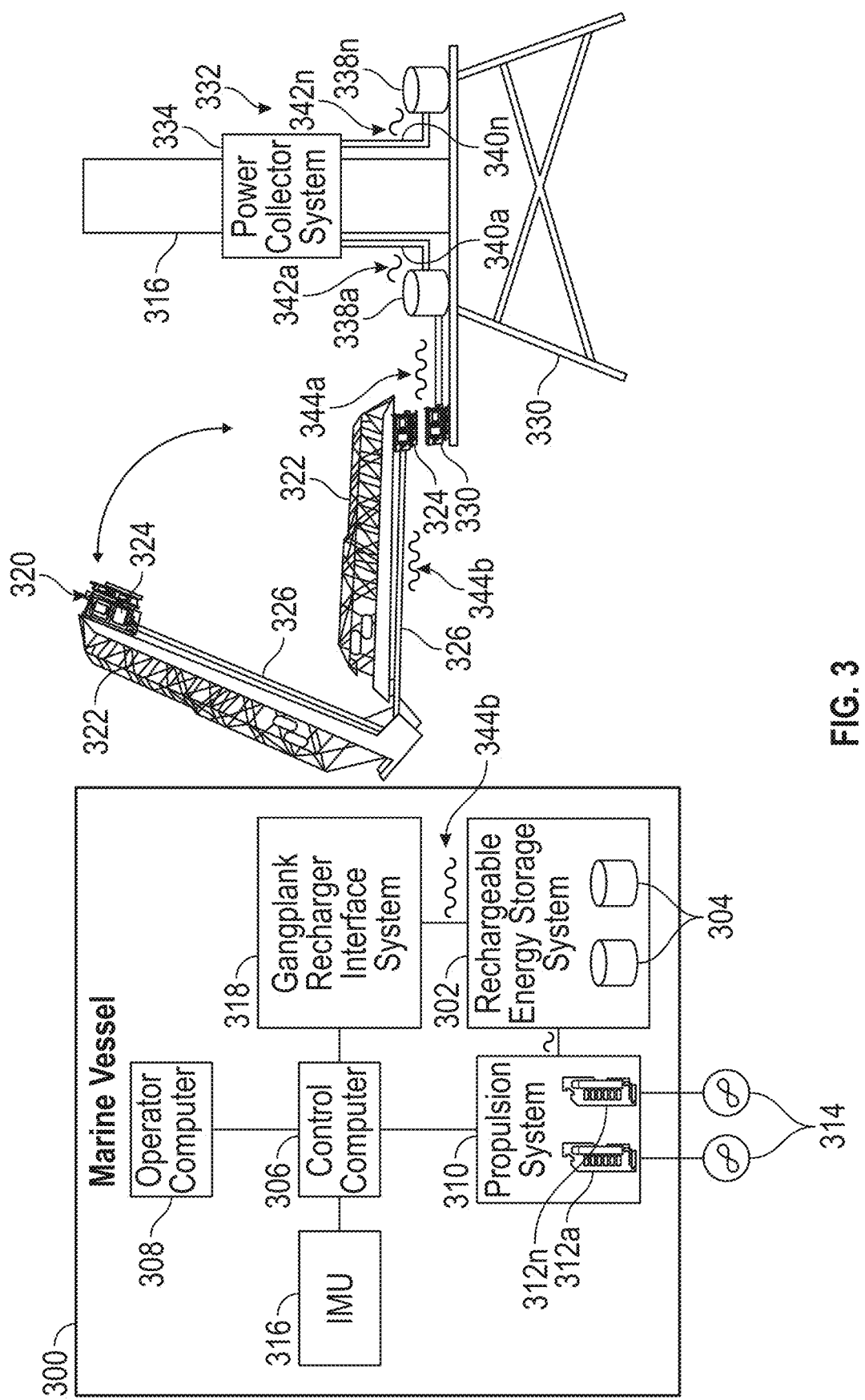
FIG. 3 is an illustration of an illustrative marine vessel showing system components including a rechargeable energy storage system for powering the marine vessel.

With regard to FIG. 3, an illustration of an illustrative marine vessel 300 showing system components including a rechargeable energy storage system 302 for powering the marine vessel is shown. The rechargeable energy storage system 302 may include one or more rechargeable energy storage sources 304 that may be recharged and used to power electrically driven systems and devices onboard the marine vessel 300. As shown, the marine vessel 300 may further include a control computer 306 for controlling operation of the marine vessel 300, including navigation using an inertial measurement unit, propulsion, communications, scheduling, and so forth, as understood in the art. The control computer 306 may be controlled by an operator computer 308 or a remote computer (not shown), such as a land-based computer or cloud computer. The control computer 306 may further be in electrical communication with a propulsion system 310 that may include engines or thrusters 312a-312n (collectively 312) that drive propellers 314 or other propulsion mechanism. Depending on the configuration of the marine vessel 300, the thrusters 312 may be powered by diesel fuel or electricity. In an embodiment, one or more of the thrusters 312 may be diesel driven and one or more thrusters may be electricity driven. An inertial measurement unit (IMU) 316 may produce inertial measurements, including global positioning be used by the control computer 306 for maintaining navigation headings and speed, but also stable or fixed positions when positioned at a platform, for example. The IMU 316 may measure parameters, such as pitch, roll, longitude, latitude, and speed vectors, and may measure absolute and/or relative positions.

In an embodiment, all of the thrusters 312 may be electricity driven. Still yet, the thrusters 312 may be of different sizes and oriented in different directions for forward, side-to-side, and reverse movement. As the marine vessel 300 may be used for working near platforms, such as offshore wind turbines (see FIG. 1), the use of thrusters 312 that are partial or all electric thrusters allows for the rechargeable energy storage system 302 to power the marine vessel 300 partially or entirely using renewable energy sources (e.g., wind turbine, solar cells, etc.) accessible at the offshore wind turbine platforms, as described herein.

The marine vessel 300 may further include a gangplank recharger interface system 318 that may control operation of a gangplank unit 320 including a gangplank 322 on which a vessel-side inductive charge component 324 is connected. A power line 326 may be electrically connected to the vessel-side inductive charge component 324 and rechargeable energy storage system 302 directly or via the gangplank recharger interface system 318. The power line 326 may carry electrical power 328 delivered to the vessel-side inductive charge component 324 by a platform-side inductive charge component 330 at a platform 332, which may be an offshore wind turbine. It should be understood that rather than the vessel-side inductive charge component 324 be connected to a gangplank 322, that the vessel-side inductive charge component 324 may be connected to a crane or other moveable structure that allows for the vessel-side inductive charge component 324 to be repositioned at a platform or land-side inductive charger component (i.e., inductive charge component located at a pier, for example).

To supply power between the platform-side inductive charge component 330 and vessel-side inductive charge component 330, a power collector system 334 connected to a structure, in this case a vertical structure, but any structure and in any orientation available to support the power collector system 334 is possible. The platform 332 may further include one or more energy storage sources 338a-338n (collectively 338) that may be charged by the power manager system 334. The power collector system 334 may be electrically coupled to power sources, such as a wind turbine mounted to the platform 332, solar cells at the platform 332, or otherwise, and the energy storage sources 338 via power lines 340a-340n (collectively 340). Electrical power 342a-342n (collectively 342) may be communicated by the power collector system 334 via power lines 340a-340n (collectively 340) to be stored by the energy storage sources 338.

In operation, the marine vessel 300 may be positioned at the platform 332 so as to rechargeable energy storage system 304 to charge the energy storage sources 304. More specifically, the gangplank recharger interface system 318 may control electromechanical components, such as one or more motors, to reposition the gangplank system 320 from a first position (e.g., raised or retracted) to a second position (e.g., lowered or extended) so that the vessel-side inductive charge component 324 may be positioned within an inductive range of the platform-side inductive charge component 330. Power signals 344a may be inductively transferred from the power collector system 334 and/or energy storage sources 338 via the platform-side inductive charge component 330 and vessel-side inductive charge component 324 so as to be power signal 344b. The power signal 344b may be conducted along the power line 326 and used to charge the energy storage sources 304.

In particular, a frequency converter (not shown) may be used to transform the 50/60 Hz, 3-phase system into the power signal 344a with an AC voltage signal at several kHz. This voltage feeds the component 330, while the component 324 receives the power signal 344b and conducts the signal 344b to the gangplank recharger interface system 318. power signal 344a. The high frequency voltage may then be converted to DC-voltage by the gangplank recharger interface system 318 or alternatively the rechargeable energy storage system 302 to recharge the rechargeable energy storage source(s) 304. In an embodiment, this system is capable of transferring more than 2 MW of energy between the components inductive charge components 330 and 324 within a distance range of between 150 and 500 mm. Other configurations of power conversion are also possible.

To maintain the platform-side inductive charge component 330 and vessel-side inductive charge component 324 in inductive proximity from one another, the control computer 306 of the marine vessel 300 may be placed into a "bumper" mode so as to maintain a highly stable position of the marine vessel 300 due to being attached to the platform 332 via lines with bumpers disposed between the marine vessel 300 and the platform 332. The gangplank 332, which is typically maintained in position on the platform 332, enables the charge components 324 and 330 to remain in inductive position relative to one another. Housings of the charge components 324 and 330 may be sufficiently durable to avoid damage such as when the two housings touch or contact one another while maintaining electrical conductors (e.g., coils) within the housings inductively coupled with one another. The control computer 306 may be configured to monitor the power signal 344b, and if the power signal 344b stops or is significantly reduced while the charge components 324 and 330 are supposed to be inductively coupled, the control computer 306 may issue a notification to the operator computer 308, which may display and/or communicate a notice to an operator that a power transfer disruption has occurred.

In an embodiment, if the marine vessel 300 is to remain floating, a stable location (e.g., within 2 feet) of the marine vessel 300 may be maintained, and the gangplank recharger interface system 318 may be set to maintain a stable position of the gangplank system 320 so that the vessel-side inductive charger 324 remains in inductive coupling with the platform-side inductive charger 330. For example, a 3-degree-of-freedom controller may maintain the vessel-side inductive charge component 324 in a fixed point in space by controlling X, Y, and Z axes of the gangplank system 320 optionally using a local IMU or other measuring device(s) on the gangplank 322 or motors controlling the gangplank 322, for example. In an embodiment, the platform-side inductive charge component 330 may be positioned on a 3-axes electromechanical system (not shown) that allows for the platform-side inductive charge component 330 to be moved relative to the vessel-side inductive charge component 324, thereby providing additional inductive charging stability between the two components 324 and 330.

A variety of other mechanical and electromechanical techniques for maintaining the platform-side inductive charge component 330 and vessel-side inductive charge component 324 in inductive proximity from one another may be used. In an embodiment, a power level may be monitored, and if the power level drops off, then the gangplank recharger interface system 318 may reposition the gangplank system 320. The power level being monitored may be the power signal 344b, for example. Still yet, electromagnetic sensing, optical sensing, or a combination thereof may be utilized. Still yet, other non-powered relative stability structures may be utilized, such as using springs or coils, dampers, universal joints, etc., to assist in maintaining the components 330 and 324 inductively coupled with one another. In another embodiment, a mechanical temporary locking system may be utilized, but the locking system may release when a certain amount of force is exerted on the locking system, thereby preventing the gangplank 322 or other structural component from being damaged.

Figure 4:
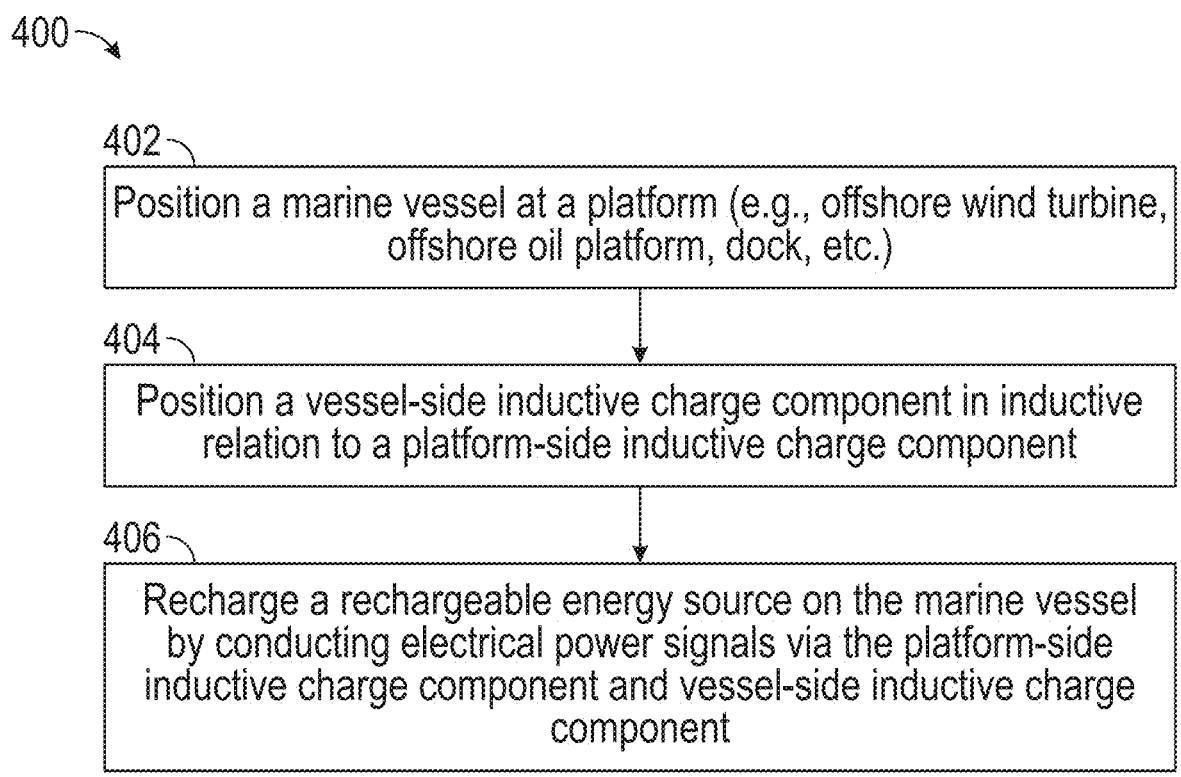
FIG. 4 is a flow diagram of an illustrative process for recharging a marine vessel from an offshore platform, such as an offshore wind turbine.

With regard to FIG. 4, a flow diagram of an illustrative process 400 for recharging a marine vessel from an offshore platform, such as an offshore wind turbine, is shown. The process 400 may start at step 402, where a marine vessel may be positioned at a platform, such as an offshore wind turbine, offshore oil platform, docket, or otherwise. In being positioned, a controller computer that controls a propulsion system of the marine vessel may be placed in a stationary hold mode, whereby the marine vessel maintains a stationary position (e.g., within 2 feet). At step 404, a vessel-side inductive charge component may be positioned in an inductive relation with a platform-side inductive charge component. To be in an inductive relation, an inductive charge between the platform-side inductive charge component and vessel-side inductive charge component, and such a relative position may depend on a variety of electromagnetic factors of the inductive charge components. The position of the inductive charge components may be maintained in relative position from one another using a variety of techniques, as described relative to FIG. 3 hereinabove. At step 406, rechargeable energy source(s) on the marine vessel may be recharged by conducting electrical power signals via the platform-side inductive charge component and vessel-side inductive charge component. The recharging may be performed until the rechargeable energy source(s) are fully recharged.

As a result of using a repositionable vessel-side inductive charge component to be positioned in an inductive relation to one another, an increased charging time may result. For example, by having the vessel-side inductive charge component mounted to an underside or other location on the gangplank that is going be moved into a bumper position when the marine vessel is positioned at a pier or platform, charging may start when the vessel-side inductive charge component or onboard coil is positioned 500 mm away from the platform-side inductive charge component or onshore coil. That is, the typically takes needed to connect the marine vessel to a plug-in charger is eliminated, and charging may be initiated immediately upon moving the gangplank into position. The increased time allows more kWhs to be transferred to the battery during mooring.

The previous description is of at least one embodiment for implementing the invention, and the scope of the invention should not necessarily be limited by this description. The scope of the present invention is instead defined by the following claims.

What is claimed is:

1. A marine vessel, comprising:
   a propulsion system;
   a rechargeable energy storage system inclusive of at least one rechargeable energy source configured to supply power to the propulsion system;
   a vessel-side inductive charge component in electrical communication with the rechargeable energy storage system, and configured to inductively couple with a platform-side inductive charge component positioned at a marine-based platform, the platform-side inductive charge component being electrically coupled to a power generator at the marine-based platform that generates electrical power to be electrically and wirelessly conducted via the platform-side inductive charge component to the vessel-side inductive charge component; and
   a moveable structure coupled to the marine vessel on which the vessel-side inductive charge component is positioned to enable the vessel-side inductive charge component to be movably positioned to be inductively coupled with the platform-side charge component, thereby causing a wireless transfer of electrical power to recharge the rechargeable energy storage device to be recharged.

2. The marine vessel according to claim 1, wherein the moveable structure is a gangplank.

3. The marine vessel according to claim 2, wherein the vessel-side inductive charge component is mounted to an underside of the gangplank, and wherein the platform-side inductive charge component faces upwards, thereby enabling the vessel-side inductive charge component to be positioned above the platform-side inductive charge component.

4. The marine vessel according to claim 1, wherein the moveable structure is a crane.

5. The marine vessel according to claim 1, wherein the platform is a platform that supports a wind turbine.

6. The marine vessel according to claim 1, wherein the rechargeable energy system is configured to notify an operator if power being received by the vessel-side inductive charge component from the platform-side charge component is below a threshold level.

7. The marine vessel according to claim 1, further comprising an electromechanical control system for maintaining the moveable structure within a range of distances from the platform-side inductive charge component.

8. The marine vessel according to claim 1, wherein the propulsion system is configured with a recharge setting that maintains the marine vessel in a stationary position relative to the platform during recharging operations.

9. A method of recharging a rechargeable storage source on a marine vessel, said method comprising:
   positioning the marine vessel at a platform;
   moving a structure coupled to the marine vessel on which a vessel-side inductive charge component is positioned to enable the structure to be moveably positioned to wirelessly couple the vessel-side inductive charge component with a platform-side charge component positioned at the marine-based platform; and
   recharging a rechargeable energy source on the marine vessel by conducting electrical power signals via the platform-side inductive charge component and vessel-side inductive charge component.

10. The method according to claim 9, wherein positioning the marine vessel at a platform includes positioning the marine vessel at an offshore wind turbine.

11. The method according to claim 9, wherein moving a structure includes moving a gangplank to move the vessel-side inductive charge element to be wirelessly coupled to the platform-side charge component.

12. The method according to claim 11, wherein moving a gangplank includes moving a gangplank beneath which the vessel-side inductive charge component is positioned such that the vessel-side inductive charge component is positioned above the platform-side charge component.

13. The method according to claim 9, further comprising automatically controlling position of the vessel-side inductive charge component within a relative distance of the platform-side inductive charge component.

14. The method according to claim 9, further comprising maintaining position of the marine vessel relative to the platform.

* * * * *